United States Patent [19]

Sumiyoshi et al.

[11] 4,356,515

[45] Oct. 26, 1982

[54] CATHODE RAY TUBE

[75] Inventors: Hiroji Sumiyoshi, Sagamihara; Mitsumasa Suzuki, Tokyo; Hiroshi Okazaki, Matsudo, all of Japan

[73] Assignee: Sony Corporation, Tokyo, Japan

[21] Appl. No.: 260,850

[22] Filed: May 5, 1981

[30] Foreign Application Priority Data

May 14, 1980 [JP] Japan ........................... 55/66145[U]

[51] Int. Cl.[3] ...................... H01J 29/87; H04N 5/645

[52] U.S. Cl. ................................ 358/246; 220/2.1 A; 358/248

[58] Field of Search ....................... 358/246, 245, 248; 220/2.1 A, 2.3 A

[56] References Cited

U.S. PATENT DOCUMENTS

| | | | |
|---|---|---|---|
| 3,317,172 | 5/1967 | Balint | 358/246 |
| 3,597,537 | 8/1971 | Kudo | 358/246 |
| 3,730,990 | 5/1973 | Miyata | 358/246 |
| 4,004,092 | 1/1977 | Rogers | 358/246 |
| 4,080,631 | 3/1978 | Puhak | 358/246 |
| 4,222,075 | 9/1980 | Mitchell | 358/246 |
| 4,236,184 | 11/1980 | Palac | 358/246 |
| 4,295,574 | 10/1981 | Nakazima | 358/246 |

FOREIGN PATENT DOCUMENTS

| | | | |
|---|---|---|---|
| 1933312 | 4/1979 | Fed. Rep. of Germany | 358/246 |
| 1513337 | 2/1968 | France | 358/246 |
| 46-1623 | 6/1971 | Japan | 358/246 |

*Primary Examiner*—Howard Britton
*Attorney, Agent, or Firm*—Hill, Van Santen, Steadman, Chiara & Simpson

[57] ABSTRACT

An improved cathode ray tube consisting of a panel member coated on its inner surface with a phosphor layer, and having a funnel member and a neck member with an electron gun mounted therein in which an image is formed on the phosphor layer by an electron beam emitted from the electron gun and comprising fittings located at the corners of the panel member with a tension band tightened to the panel member over the fittings with each of the fittings having first portions substantially parallel to the tubular axis of the cathode ray tube and second portions extending from the first portion and extending in the direction perpendicular to the tubular axis of the tube to form a substantially L-shaped member in cross-section. The first portion has curved surfaces which conform with a peripheral wall surface of the cathode ray tube at its top end portions and indented portions which distribute bearing stresses of a tension band uniformly over the tube to eliminate problems arising during explosion.

7 Claims, 13 Drawing Figures

FIG. 1
(PRIOR ART)
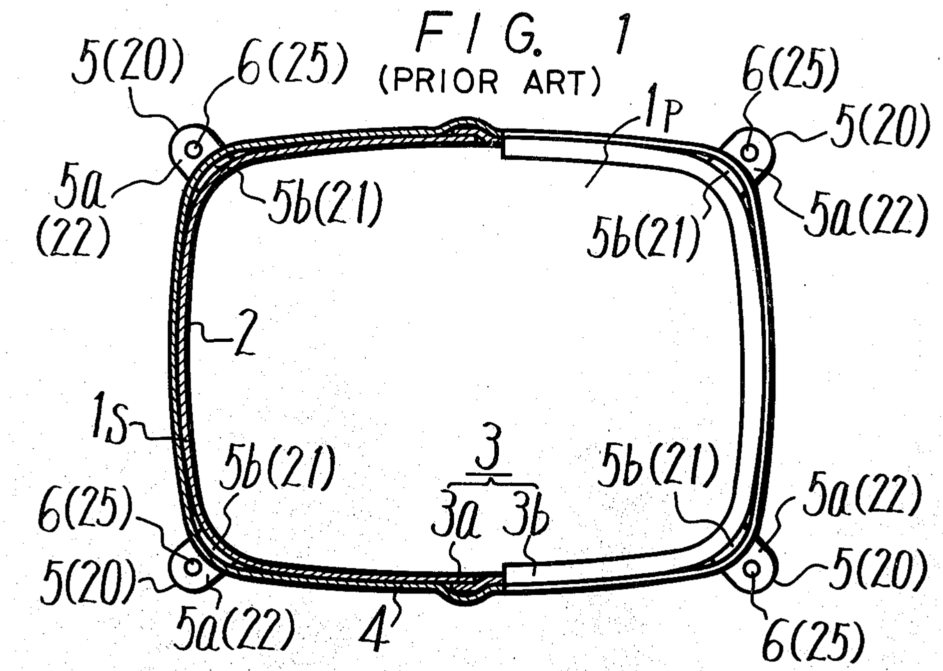
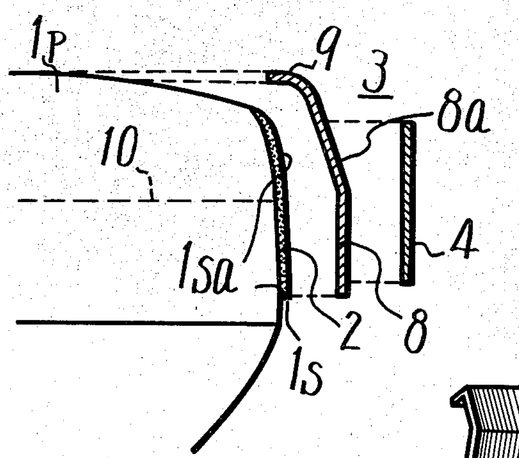
FIG. 2
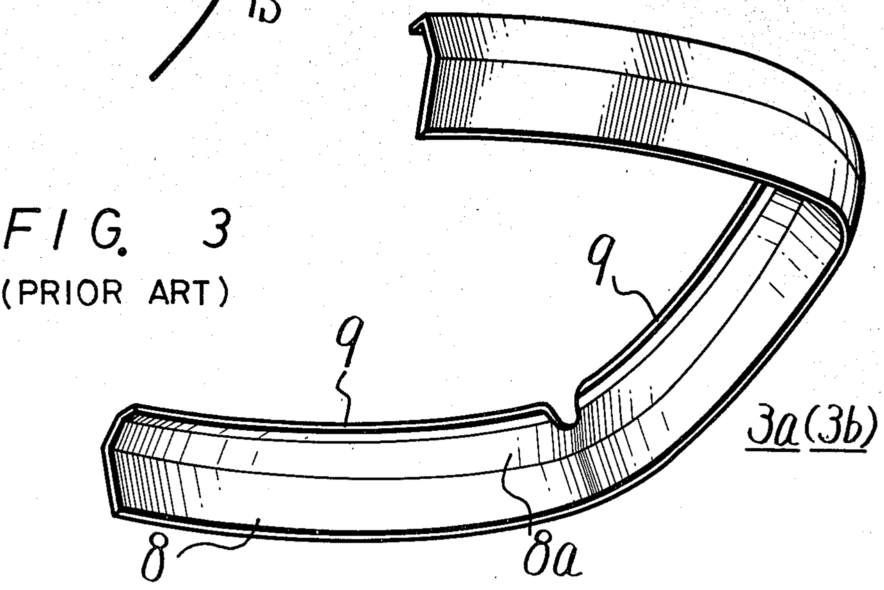
FIG. 3
(PRIOR ART)

CATHODE RAY TUBE

BACKGROUND OF THE INVENTION

1. Field of the Invention

The present invention relates generally to cathode ray tubes and particularly to an explosion-proof cathode ray tube with fittings which are fixed to the cabinet, chassis or the like to hold the cathode ray tube in place.

2. Description of the Prior Art

Prior art explosion-proof cathode ray tubes are illustrated in FIGS. 1 and 2. FIG. 1 is a front view of the explosion-proof cathode ray tube and FIG. 2 is a partial cross-sectional view. As illustrated in FIGS. 1 and 2 around the outer periphery of the skirt portion 1*s* is formed about a panel member 1*p* which has a phosphor layer coated on its inner surface to form a cathode ray tube envelope. The cathode skirt portion 1*s* extends around the peripheral edge of the panel member 1*p* along the axis of the envelope and a rim band 3 is located with a tape containing a bonding agent 2 such as thermo-setting or pressure-sensitive agent and a tension band 4 is wrapped around the rim band 3 and then tightened.

The rim band 3 is formed of two portions or halves 3*a* and 3*b* each being generally U-shaped and upon tightening they tighten the skirt portion 1*s* of the panel member 1*p* from the left and right sides thereof. As shown in FIG. 3, each of the halves 3*a* and 3*b* has a wall engaging portion 8 which contacts and covers the outer peripheral surface of the skirt portion 1*s* of the panel member 1*p* of the cathode ray tube and a flange portion 9 which extends inwardly from the wall portion 8 and is located on the peripheral edge portion of the front portion of the panel member 1*p*.

Since the panel member 1*p* of the cathode ray tube is made of molded glass in order to provide wrapping by the metal mold the skirt portion is provided with a portion with an inclined surface 1*sa* which becomes smaller in its outer diameter as the front portion of the panel member 1*p* approaches and defines a mold match line 10 between the inclined surface 1*sa* and the rear surface of the skirt portion 1*s* which mold match line 10 extends along the peripheral surface direction of the skirt portion 1*s* is illustrated in FIG. 2. So as to conform to the above inclination of the skirt portion 1*s* the wall portion 8 of each of the halves 3*a* and 3*b* of the rim band 3 is provided with an inclined surface 8*a* which conforms with the inclined surface 1*sa* of the skirt portion 1*s* of the panel member 1*p* as illustrated in FIG. 3. The rim band 3 is placed in contact with the outer periphery of the skirt portion 1*s* of the panel member 1*p* by using the bonding agent 2 and the tension band 4 is tightened about the outer sides of the rim band 3 to bond it to the panel member 1*p*.

The explosion-proof cathode ray tube constructed above is provided with fittings at its corners for allowing the tube to be fixed to a cabinet or a chassis.

As shown in FIG. 4, each of the fittings 5 comprises a metal body of generally L-shaped in cross-section. One planar plate portion 5*a* of the fitting 5 is formed with an attaching opening 6 formed therethrough so that the fitting 5 can be attached to the chassis by a bolt which passes through the opening 6. The other plate portion 5*b* of the fitting 5 is formed with a curved surface which conforms with the outer configuration of the skirt portion 1*s* of the panel member 1*p* at the corners. The plate portion 5*b* of each of the fittings 5 is mounted so it abuts on the outer surface of the rim band 3 at its corners as shown in FIG. 1 and is welded thereto. The tension band 4 passes over the portions 5*b* as illustrated in FIG. 1.

As shown in FIGS. 5 and 6, the tension band 4 is positioned such that it covers the skirt portion 1*s* of the panel member 1*p* with the mold match line 10 being at the center of the tension band 4 regardless of the position of the mold match line 10. For example, in FIG. 5, the mold match line 10 is positioned at substantially the center of the skirt portion 1*s* of the panel member 1*p* and the band 4 is centered on the mold match line 10. In FIG. 6, the mold match line 10 is positioned forwardly of the center of the skirt portion 1*s* of the panel member 1*p* toward its front surface and thus the band 4 would be centered on the mold line 10 and would be placed forwardly of the band in FIG. 5.

In FIGS. 5 and 6, cathode ray tubes of the same size are illustrated. Although the cathode ray tubes 1 are the same size, normally the design of the panel member 1*p* will not be the same. Of course, often cathode ray tubes which have different sizes are used and the position of the mold match line 10 and the angle between the inclined surface 1*sa* of the skirt portion 1*s* will differ. In other words, the angle of wrapping will be different. For example, the tension band 4 having a width of 14 to 19 mm is used for cathode ray tubes of 14 inches and the tension band 4 with a width of 19 mm is also used for cathode ray tubes of 20 to 27 inches in size. In such cathode ray tubes when an impact is applied to the cathode ray tube 1 on the front of the panel member 1*p* or the cathode ray tube 1 is subjected to a so-called ball impact test in which the impact of a steel ball is applied to the front of the panel member 1*p*, the deformation of the panel member 1*p* in the case of the cathode ray tube shown in FIG. 6 will be less than that of the cathode ray tube shown in FIG. 5 since the mold match line 10 in the case of FIG. 6 is located near the front side of the skirt portion 1*s* as compared to the structure illustrated in FIG. 5. Thus, the explosion-proof effect of the example illustrated in FIG. 6 is greater than that of the tube shown in FIG. 5. In other words, when an impact is applied to the panel member 1*p*, a crack will be generated first in the glass of the panel member 1*p* and then the crack will extend instantly from that portion with the glass forming the panel member 1*p* being shattered and a so-called explosion will occur. However, during the construction of the cathode ray tube since the bonding agent 2 adheres to the skirt portion 1*s* of the panel member 1*p* the speed at which the crack extends is restricted and the extending of the crack will be prevented. Therefore, even if the crack extends across the front portion of the panel member 1*p* the instantaneous dropping and scattering of the glass forming the panel member 1*p* will be avoided. In this case, the adhesion of the bonding agent 2 where the tension band 4 wraps around will be near to the front portion of the panel member 1*p* and the extension of the crack will be restricted and thus the explosion-proof effect will be substantial.

When the tension band is wrapped such that the width of the band from the mold match line 10 to both sides are substantially equal as illustrated in FIGS. 5 and 6 there is no danger that the tension band 4 will be displaced. However, if the tension band is wrapped such that it is positioned near the front end of the panel member 1*p* as possible relative to the mold match line 10 as shown, for example, in FIG. 5 in which the mold match line is not itself displaced to the front end of the panel and the tension band 4 having the width of for example 19 mm is wrapped such that a portion 11 mm wide of the band contacts the front portion of the panel member 1*p* ahead of the mold match line 10 and the remaining portion of 8 mm makes contact with the rear portion of the panel member 1*p* there is a tendency for the tension band 4 to be displaced.

SUMMARY OF THE INVENTION

It is an object of the present invention to provide a cathode ray tube in which a tension band is prevented from being displaced from the tube.

Another object of the invention is to provide a cathode ray tube which has a high degree of explosion-proof.

According to an aspect of the present invention, the cathode ray tube comprises a panel member with a phosphor layer coated on its inner surface; a funnel member; a neck member having an electron gun mounted therein with the panel, the funnel member and neck member forming an envelope of the cathode ray tube in which an image is formed on the phosphor layer by an electron beam emitted from the electron gun and fittings respectively located at the corners of the panel member with a tension band wrapped about the panel member on the outside of the fittings and then tightened to the panel member; and each of the fittings consisting of first portions substantially parallel to a tubular axis of the envelope and having second portions extending from the first portion and extending in a direction substantially perpendicular to the tubular axis of the envelope such that each of the fittings has an L-shaped configuration and cross-section and the first portion of the fitting having at its top end portion curved surfaces which conform with a peripheral wall surface of the envelope and at the top end portion a center portion which has curved surfaces such that a surface is substantially parallel to the tubular axis of the envelope.

Other objects, features and advantages of the invention will become apparent from the following description of certain preferred embodiments thereof taken in conjunction with the accompanying drawings in which like references designate the same parts and elements.

BRIEF DESCRIPTION OF THE DRAWINGS

FIG. 1 is a front partial cross-sectional view of a prior art explosion-proof cathode ray tube;

FIG. 2 is a partially cross-section exploded view of the cathode ray tube shown in FIG. 1;

FIG. 3 is a perspective view illustrating one-half of an example of the rim band useable in cathode ray tubes of the prior art and the present invention;

DESCRIPTION OF THE PREFERRED EMBODIMENTS

In the present invention, consideration is given to the fact that when a rim band adheres to the outer periphery of a skirt portion of a panel member of a cathode ray tube as, for example, by using a bonding agent, fittings which are located at the corners of the skirt portion of the panel member and on the outside thereof and a tension band which is tightened to the panel member from the outside to cover the fittings causes the tightening force of the tension band to be most effectively exerted on the panel members at the corners and the present invention provides novel fittings of special structure for use with cathode ray tubes so as to prevent explosions.

Figure 5:
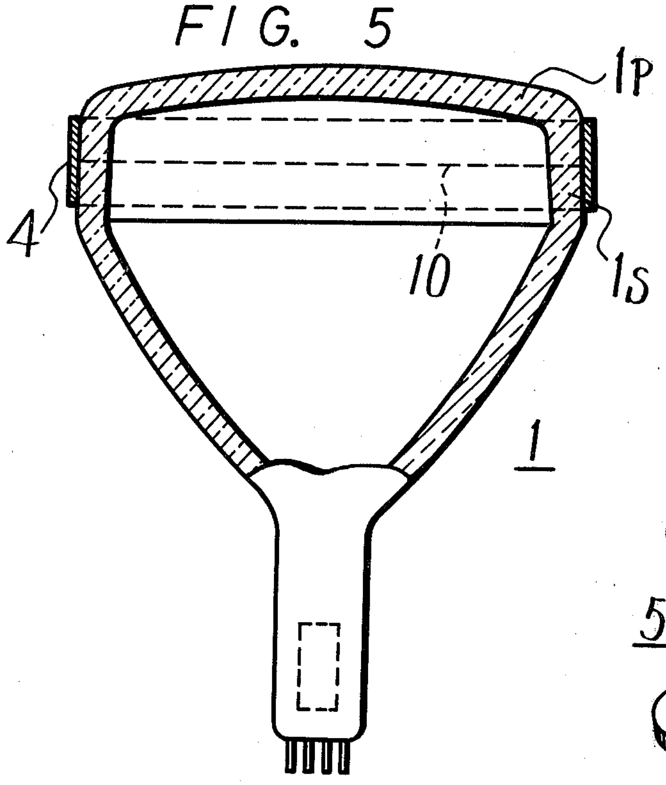
FIG. 5 illustrates in schematic diagram an explosion-proof cathode ray tube.
Figure 4:
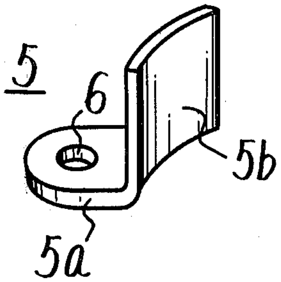
FIG. 4 (PRIOR ART)
FIG. 4 is a perspective view of a prior art fitting used with a cathode ray tube.
Figure 6:
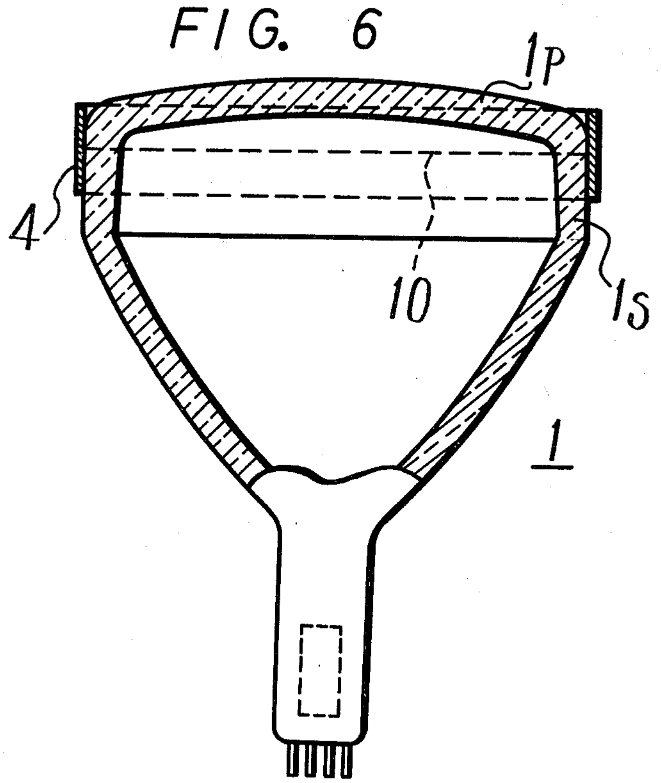
FIG. 6 illustrates in schematic form an explosion-proof cathode ray tube.
Figure 7:
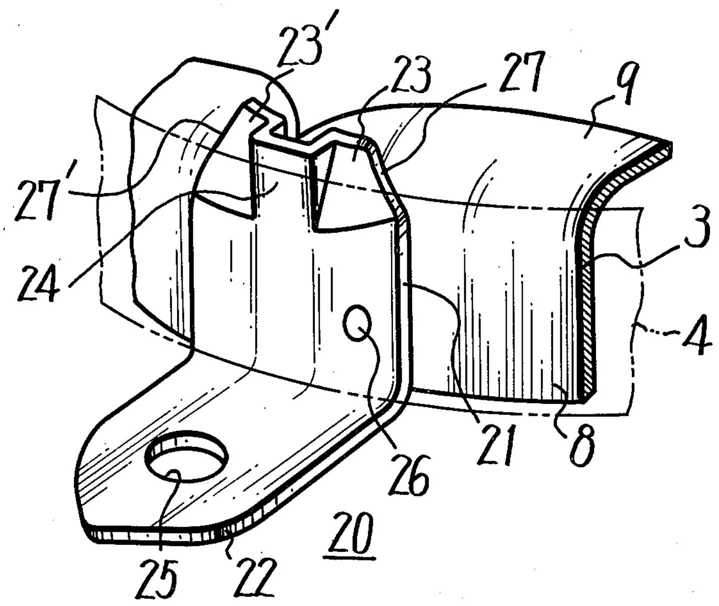
FIG. 7 is a perspective view showing an example of fittings for use with a cathode ray tube according to the present invention.

The invention is illustrated in FIG. 7 which illustrates a fitting of a cathode ray tube according to the present invention. The cathode ray tube of the present invention is substantially the same as those described in connection with FIGS. 1 to 3 and FIGS. 5 and 6 and the essential part of the invention is the fitting which is used with the cathode ray tube and which will be described in detail. In FIG. 7, a fitting 20 is used for attaching a cathode ray tube to a chassis. The fitting 20 is made of a single metal plate and consists of a first portion 21 and a second portion 22 which are integrally formed into an L-shaped configuration from the side view. The first portion 21 of the fitting 20 extends generally parallel to and along the tubular axis of the envelope with the cathode ray tube and at right angles to the front face 1*p* of the tube. The portion 21 is curved as can be seen in FIG. 7 so as to conform with the curved outer surface of the corner of the envelope of the cathode ray tube. At both sides of the end portion of the first portion 22 there are provided curved surfaces 23 and 23' which are curved from the cylindrical surface to the axis of the envelope of the cathode ray tube so as to engage the inclined surface 1*sa* of the skirt portion 1*s* of the panel member 1*p* located at the front side of the mold match line 10. Between the pair of curved surfaces 23 of the first portion 21, is a center ridge portion 24 which can clearly be seen in FIG. 7. Both of the shoulder portions 23 and 23' of the first portion 21 are cut-out to provide cut-out portions 27 and 27' respectively, so that the upper end portions of the first portion 21 is reduced in width.

The second portion of the fitting 22 is planar and extends in the direction approximately perpendicular to the extending direction of the first portion 21 and its center rib portion 24. The portion 22 is formed with an opening 25 through which a bolt for attaching it to a cabinet or chassis for holding the cathode ray tube can be mounted.

The metal fitting 20 is welded or otherwise attached to the rim base 3 at a predetermined position as shown for example, by numeral 26 in FIG. 7 and the fittings are located at each corner of the cathode ray tube and are gripped between the rim band 3 and the tension band 4.

Figure 8:
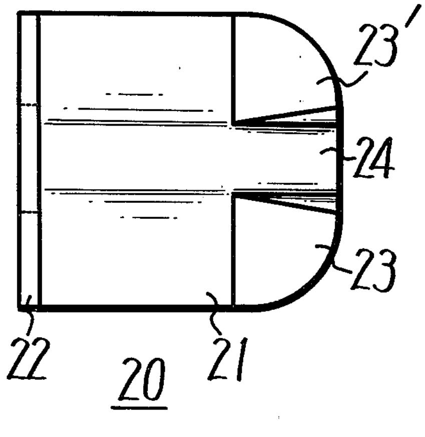
FIG. 8 is a front plan view illustrating a first portion of another example of the fittings for use with a cathode ray tube according to the invention.
Figure 9:
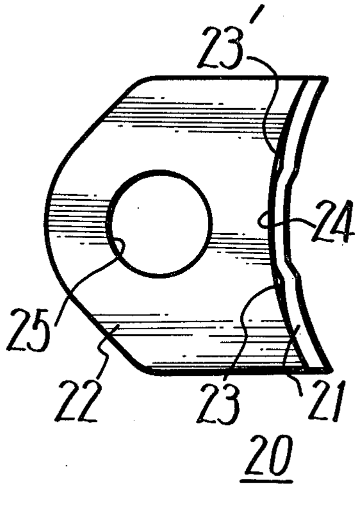
FIG. 9 is a front view showing a second portion of the fitting illustrated in FIG. 8.

The fittings of the invention illustrated in FIGS. 7, 8 and 9 replace the fittings 5 illustrated in FIG. 1. The two side curved portions 23 and 23' of the first portion 21 of the fitting 20 go along the peripheral wall surface of the cathode ray tube and particularly the inclined surface 1*sa* of the skirt portion 1*s* of the panel member 1*p*. Thus, the curved portions 23 and 23' intend to engage the curved portion of the cathode ray tube and the rib center portion 24 generally extends along the curved surface in the peripheral surface direction and extends approximately parallel to the tubular axis without following along the tubular wall of the cathode ray tube. Utilizing the cathode ray tube with fittings 20 according to the invention with four fittings 20 located at the corners of the explosion-proof cathode ray tube, the straight rib portion 24 provided on the first portion 21 of each of the fittings 20 which rib portion extends along the tubular axis is engaged and held by the tension band 4. Thus, even if the tension band is wrapped such that it is displaced forward from the mold line 10 on the skirt portion 1*s* of the panel member 1*p* the tension band will be supported by the rib portion 24 which extends along the tubular axis and the tension band will not be displaced during explosion of the tube. Since the curved surfaces 23 and 23' are provided on both sides of the rib portion 24, the tightening force of the tension band 4 will be effectively applied through the curved surfaces 23 and 23' to the panel member 1*p*. Further, since the cut-out portions 27 and 27' are provided on both shoulder portions of the first portion 21 of each of the fittings 20, the tension band 4 can be wrapped along the tube wall of the cathode ray tube more positively and, thus, the tightening force by the band 4 will more effectively be applied to the panel member 1*p*.

Figure 10A:
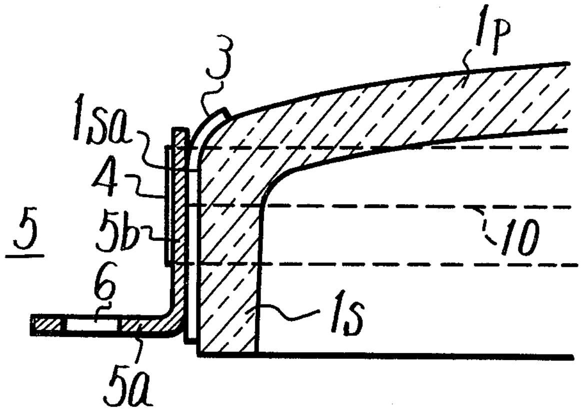
FIG. 10A (PRIOR ART)
FIG. 10A is a partially cut-away sectional view to explain the prior art cathode ray tubes.
Figure 10B:
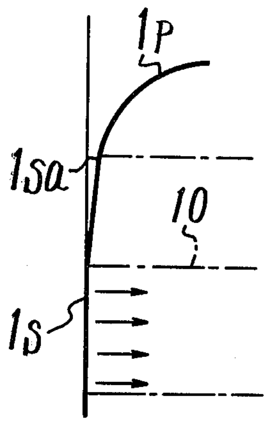
FIG. 10B (PRIOR ART)
FIG. 10B is a graph illustrating the structure of FIG. 10A.

FIG. 10A illustrates the prior art fitting 5 wherein the tightening force by the tensioning band 4 is applied to the panel member 1*p* at the center of the plate portion 5*b* along the tubular axis and as indicated by the arrows in FIG. 10B, no tightening force by the band 4 is applied to the portion of the panel member 1*p* near the front portion ahead of the mold match line 10. Thus, in this example, which illustrates the prior art fitting 5, the force applied by the tension band 4 is applied in a relatively small area as illustrated in FIG. 10B.

Figure 11A:
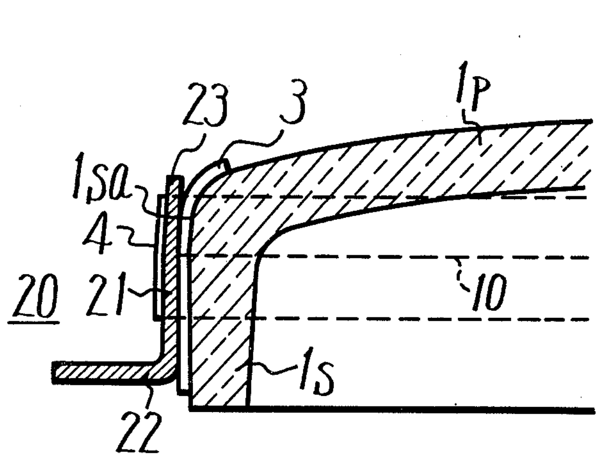
FIG. 11A is a schematic partially cut-away sectional view to explain the cathode ray tube according to the invention.
Figure 11B:
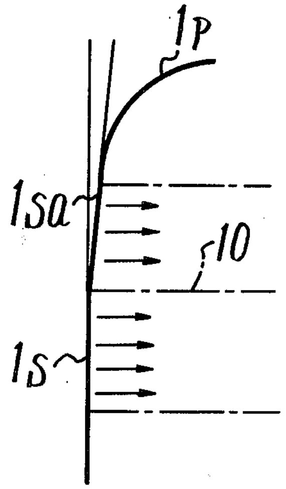
FIG. 11B is a schematic diagram for explaining the cathode ray tube of the present invention.

FIG. 11A illustrates the fitting 20 according to the invention at the cross-section of the curved surface 23 along the tube wall in the direction of the tubular axis of the cathode ray tube, the tightening force applied by the tension band 4 from the rib portion 24 substantially along the tubular axis to the curved surfaces 23 and 23' and the tightening force by the tension band 4 due to the curved surfaces 23 and 23' will be effectively applied to the panel member 1*p* including the portion near the front edge ahead of the mold match line 10 as is illustrated in FIG. 11B by the arrows. Since the tightening force applied by the tension band 4 to the panel member 1*p* is large especially at the corners of the cathode ray tube if the fittings 20 of the invention are utilized at the corners, the displacement of the band will be prevented and also the explosion-proof effect in the cathode ray tube will be substantially improved.

In the above description of the invention, the rim band is used but the present invention can also be applied to an explosion-proof cathode ray tube which does not utilize a rim band.

FIGS. 8 and 9 illustrate another example of a fitting for use with a cathode ray tube according to the present invention. In this example, the shoulder portions of the first portion 21 of the fitting 20 at both sides of the rib portion 24 are rounded as illustrated in FIG. 8 and the second portion 22 of the fitting is substantially the same as that in the first example as illustrated in FIG. 9. The fitting illustrated in FIGS. 8 and 9 accomplishes substantially the same effect as the fitting illustrated in FIG. 7.

It will be apparent that many modifications and variations can be effect by those skilled in the art without departing from the spirit and scope of the novel concepts of the present invention which are to be limited only by the appended claims.

We claim as our invention:

1. A cathode ray tube, comprising: a panel member with a phosphor layer coated on its inner surface; a funnel member; a neck member having an electron gun therein, said panel member, funnel member and neck member forming an envelope of said cathode ray tube in which an image is formed on said phosphor layer by an electron beam emitted from said electron gun; fittings respectively located at corners of said panel member; and a tension band wrapped on said panel member on the outside of said fittings and then tightened to said panel member; each of said fittings consisting of a first portion substantially parallel to a tubular axis of said envelope and a second portion continued from said first portion and extending in a direction substantially perpendicular to the tubular axis whereby each of said fittings has an L-shaped configuration in cross-section, said first portion having at its outer end portion curved surfaces which conform with a peripheral wall surface of said envelope and has a center rib portion between said curved surfaces, said center rib portion having a surface substantially parallel to the tubular axis of said envelope.

2. A cathode ray tube as claimed in claim 1 further comprising a rim band bonded to an outer peripheral surface of a skirt portion of said panel member with a bonding agent, said fittings being fixed to said rim band at the corners of said tube.

3. A cathode ray tube as claimed in claim 1, wherein said tension band is located so that its center line in its width direction lies on a mold match line of said panel member.

4. A cathode ray tube as claimed in claim 1, wherein said tension band is so located that its center line in its width direction is positioned ahead of a mold match line of said panel member.

5. A cathode ray tube as claimed in claim 2, wherein said rim band consists of a plurality of divided portions.

6. a cathode ray tube as claimed in claim 2, wherein said rim band consists of a wall portion having a configuration which conforms with an outer surface of a skirt portion of said panel member and has a flange portion which extends from said wall portion inwardly and along a periphery of a front portion of said panel member.

7. A cathode ray tube according to claim 1 wherein said fittings each have a pair of curved engaging portions with a rib formed at its center between said engaging portions and said second portion formed with an opening for attaching said tube to a chassis.

* * * * *